United States Patent
Dickenson et al.

(10) Patent No.: US 7,475,278 B2
(45) Date of Patent: *Jan. 6, 2009

(54) METHOD, SYSTEM AND COMPUTER PROGRAM PRODUCT FOR RECOVERY OF FORMATTING IN REPAIR OF BAD SECTORS IN DISK DRIVES

(75) Inventors: Marc A. Dickenson, Austin, TX (US); John S. Langford, Austin, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/274,627

(22) Filed: Nov. 15, 2005

(65) Prior Publication Data
US 2007/0168700 A1    Jul. 19, 2007

(51) Int. Cl.
*G06F 11/00* (2006.01)
(52) U.S. Cl. .......................... 714/5; 711/113
(58) Field of Classification Search .............. 714/5, 714/6, 7, 8, 2; 711/113, 114
See application file for complete search history.

(56) References Cited

U.S. PATENT DOCUMENTS

| | | | |
|---|---|---|---|
| 5,412,661 A * | 5/1995 | Hao et al. ...................... 714/6 |
| 5,694,600 A * | 12/1997 | Khenson et al. ................. 713/2 |
| 5,974,544 A * | 10/1999 | Jeffries et al. .................. 713/1 |
| 6,175,904 B1 * | 1/2001 | Gunderson ................... 711/162 |
| 6,308,264 B1 * | 10/2001 | Rickey .......................... 713/2 |
| 6,839,864 B2 | 1/2005 | Mambakkam et al. |
| 6,907,496 B2 * | 6/2005 | Langford et al. ............ 711/103 |
| 7,038,609 B1 * | 5/2006 | Hurrell ........................ 341/156 |
| 2002/0051631 A1 * | 5/2002 | Okamoto et al. ............ 386/126 |
| 2002/0057510 A1 | 5/2002 | Hoskins et al. |
| 2004/0044886 A1 | 3/2004 | Ng et al. |
| 2004/0210792 A1 | 10/2004 | Foster et al. |
| 2006/0107091 A1 * | 5/2006 | Hafner et al. ................... 714/5 |
| 2006/0156059 A1 * | 7/2006 | Kitamura ........................ 714/6 |

* cited by examiner

*Primary Examiner*—Dieu-Minh Le
(74) *Attorney, Agent, or Firm*—Casimer K. Salys; Dillon & Yudell LLP (57) ABSTRACT

A method for correcting a formatting error in a boot sector of a hard disk drive is disclosed. An error in a first formatting of a first hard disk drive is discovered, and a second formatting is extracted from a second hard disk drive storing second data. The erroneous first formatting is replaced with a modification of the second formatting, and first data is stored in the first hard disk drive with the modification of the second formatting. The first data is different from the second data.

20 Claims, 5 Drawing Sheets

METHOD, SYSTEM AND COMPUTER PROGRAM PRODUCT FOR RECOVERY OF FORMATTING IN REPAIR OF BAD SECTORS IN DISK DRIVES

CROSS-REFERENCE TO RELATED APPLICATION

The present application is related to the following copending U.S. patent application filed on even date herewith, and incorporated herein by reference in its entirety:

Ser. No. 11/274,850, entitled "METHOD, SYSTEM AND COMPUTER PROGRAM PRODUCT FOR RECOVERY OF FORMATTING IN REPAIR OF BAD SECTORS IN FLASH MEMORY".

BACKGROUND OF THE INVENTION

1. Technical Field

The present invention relates in general to data processing systems and in particular to hard disk drives associated with data processing systems. Still more particularly, the present invention relates to a system, method and computer program product for recovery of formatting in repair of bad sectors in hard disk drives associated with a data processing system.

2. Description of the Related Art

Due to advances in electronic and magnetic technology, the capacity of hard drives at any given price point is doubling annually. While the advances in storage capacity that have been witnessed over the past decade have enabled a revolution in the type and quantity of data that can be stored, the correlative reductions in size and increases in the speed of moving parts have created a daunting array of obstacles to reliability.

The reliability of a hard drive is specified in terms of its mean time between failures (MTBF) and the unrecoverable error rate. Typical specifications for recent server-class drives are 1,000,000 hours MTBF and 1 unrecoverable error in $10^{15}$ bits read. However, increases in hard disk density make it harder to maintain reliability due to lower flying heights, greater sensitivity to media defects and smaller scale. Difficulties with error frequency have prompted the creation of error-correction techniques.

Some methods of error correction require manual intervention. Others, such as RAID (Redundant Array of Independent Disks) arrays (e.g., RAID-1 or RAID-5) are often used to further improve the reliability of storage systems by correcting a variety of errors through redundant storage. However, with high-capacity drives, a single level of redundancy is no longer sufficient to reduce the probability of data loss to a negligible level. Additionally and unfortunately, redundant storage of data or formatting increases both cost and storage capacity requirements.

It is also possible for a disk drive to occasionally return erroneous data on a read command because a previous write command has not written to the correct location on the recording medium or because the drive failed to record on the medium at all. This type of failure may be due to an intermittent hardware failure or a latent design defect. For example, the drive might write the data to the wrong LBA (Logical Block Address) due to a firmware bug, or it may write off track, or it may fail to write at all because a drop of lubricant (commonly referred to as 'lube') lifts the head off of the disk surface. It may also fail to write due to any power interruption during a write or format operation.

In data processing systems, failures to write carry the risk that formatting for data stored in a hard disk drive can become corrupted or damaged. As with the error correction methods for other problems in hard disks, prior art methods for recovering from corruption of formatting data involve the constant maintenance of redundant copies of the data or require that the user corrects the corruption of the formatting through replacement or manual repair.

The state of prior art methods results in several drawbacks. First, maintaining redundant copies of formatting data is not desirable, due to the associated increase in storage requirements. This concern about storage requirements becomes particularly important in embedded systems or other systems in which storage resources are limited. Similarly, prior art methods that require the user to correct the corruption of formatting data through replacement or manual repair involve time costs to the user or information technology personnel. The reduction of such costs is desired.

SUMMARY OF THE INVENTION

A method for correcting a formatting error in a boot sector of a hard disk drive is disclosed. An error in a first formatting of a first hard disk drive is discovered, and a second formatting is extracted from a second hard disk drive storing second data. The erroneous first formatting is replaced with a modification of the second formatting, and first data is stored in the first hard disk drive with the modification of the second formatting. The first data is different from the second data.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention takes advantage of a dual media image design, in which similar copies of formatting data, also called critical data, exist in different sectors in a hard disk drive or within multiple hard disk drives. If and when an interruption to an operation touching formatting data causes corruption of a sector of formatting data, the present invention detects the corruption and utilizes a similarly formatted sector as a template to reconstruct the corrupted formatting. The reconstructed formatting is then used to repair the corrupted sector, allowing the system to return to full capability and function without alerting the user to the corruption. The present invention provides a solution to data corruption without requiring specific redundant copies of formatting data or requiring user intervention.

Figure 1A:
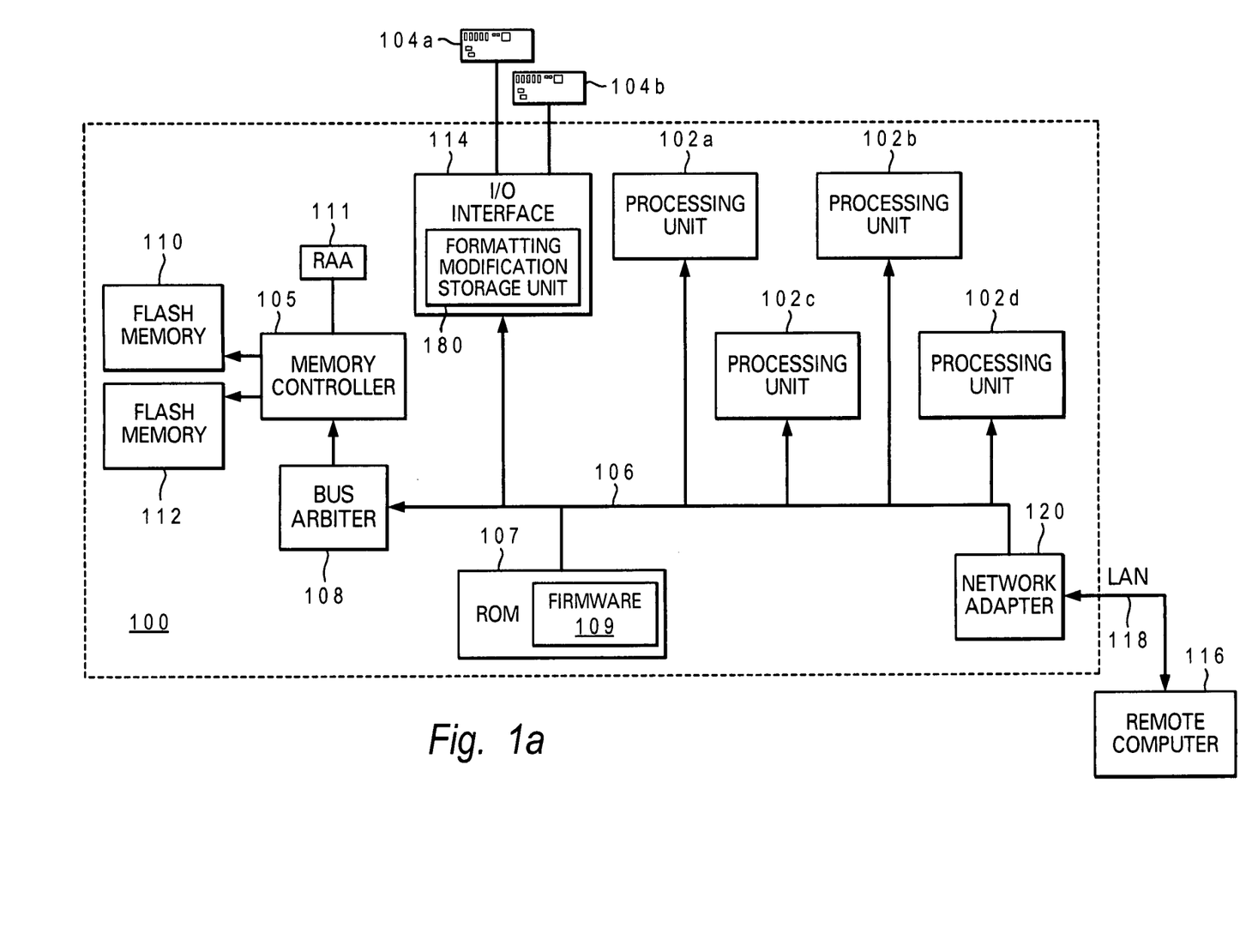
FIG. 1A depicts a block diagram of a data processing system in which a preferred embodiment of the method, system and computer program product for recovery of formatting data for repair of bad sectors in a hard disk drive attached to a data processing system is implemented.

With reference now to figures and in particular with reference to FIG. 1A, there is depicted a data processing system 100 that may be utilized to implement the method, system and computer program product of the present invention. For discussion purposes, the data processing system is described herein as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.), data storage devices, and personal and consumer electronics devices (e.g., handheld computers, Web-enabled televisions, home automation systems, multimedia viewing systems, etc.).

FIG. 1A and the following discussion are intended to provide a brief, general description of an exemplary data processing system adapted to implement the present invention. While parts of the invention will be described in the general context of instructions residing as firmware within ROM within a server computer, those skilled in the art will recognize that the invention also may be implemented in a combination of program modules running in an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102a-102d, at least two units of flash memory 110 and 112 coupled to a memory controller 105, at least one unit of RAM 111 coupled to memory controller 105, and a system interconnect fabric 106 that couples memory controller 105 to processing unit(s) 102a-102d and other components of data processing system 100. Commands on system interconnect fabric 106 are communicated to various system components under the control of bus arbiter 108.

Data processing system 100 further includes additional non-volatile bulk storage media, such as a first hard disk drive 104a and a second hard disk drive 104b. First hard disk drive 104a and second hard disk drive 104b are communicatively coupled to system interconnect fabric 106 by an input-output (I/O) interface 114. Although hard disks are described above, it should be appreciated by those skilled in the art that other types of media which are readable by a computer, such as a removable magnetic disks, CD-ROM disks, magnetic cassettes, hard disk drive cards, digital video disks, Bernoulli cartridges, and other later-developed hardware, may also be used to provide non-volatile bulk data storage in the exemplary computer operating environment. Additional non-volatile storage is provided in ROM 107, which contains firmware 109 for performing various essential system operations. The present invention is performed using instructions stored as firmware 109 within ROM 107 and is illustrated with respect to two hard disk drives 104a-104b coupled to I/O interface 114, which contains a formatting modification storage unit 180. The present invention is also applicable to first hard disk drive 110 and second hard disk drive 112 and a wide range of other media that employ dual media image design.

Data processing system 100 may operate in a networked environment using logical connections to one or more remote computers, such as remote computer 116. Remote computer 116 may be a server, a router, a peer device or other common network node, and typically includes many or all of the elements described relative to data processing system 100. In a networked environment, program modules employed by data processing system 100, or portions thereof, may be stored in a remote memory storage device, such as remote computer 116. The logical connections depicted in FIG. 1 include connections over a local area network (LAN) 118, but, in alternative embodiments, may include a wide area network (WAN).

When used in a LAN networking environment, data processing system 100 is connected to LAN 118 through an input/output interface, such as a network adapter 120. It will be appreciated that the network connections shown are exemplary and other means of establishing a communications link between the computers may be used.

Figure 1B:
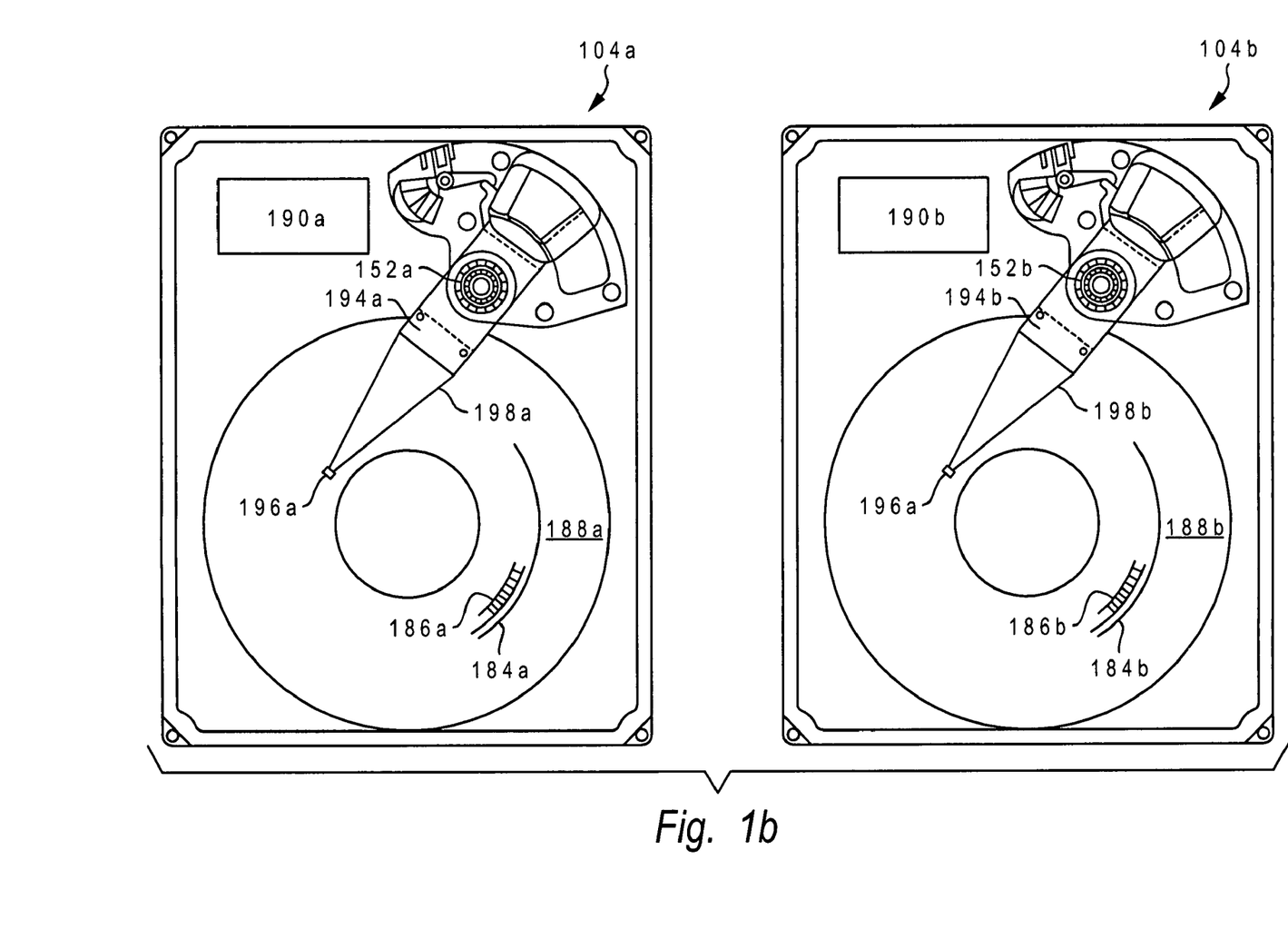
FIG. 1B depicts a hard disk drive attached to a data processing system in accordance with a preferred embodiment of the present invention.

Referring now to FIG. 1B, two hard disk drives attached to a data processing system in accordance with a preferred embodiment of the present invention is illustrated. FIG. 1B is a top view of the interior of two hard disk drives 104a-104b with the covers removed. Each of hard disk drives 104a-104b includes a suspension 198a-198b to urge a slider 196a-196b toward a disk 188a-188b. Suspensions 198a-198b also provide gimbaled attachment of sliders 196a-196b, which allows sliders 196a-196b to pitch and roll as sliders 196a-196b ride on air bearings. The data detected from disks 188a-188b by transducers on sliders 196a-196b is processed into a data readback signal by signal amplification and processing circuitry in integrated circuit arm electronics (AE) modules 190a-190b located near arms 194a-194b. Arms 194a-194b are pivotal about joints 192a-192b to move sliders 196a-196b to a desired radial position. Tracks 184a-184b are located at radial positions on disks 188a-188b. Groups of sectors 186a-186b are angularly spaced around the disk in tracks 184a-184b. Groups of sectors 186a-186b are described in more detail with reference to FIG. 1C.

Figure 1C:
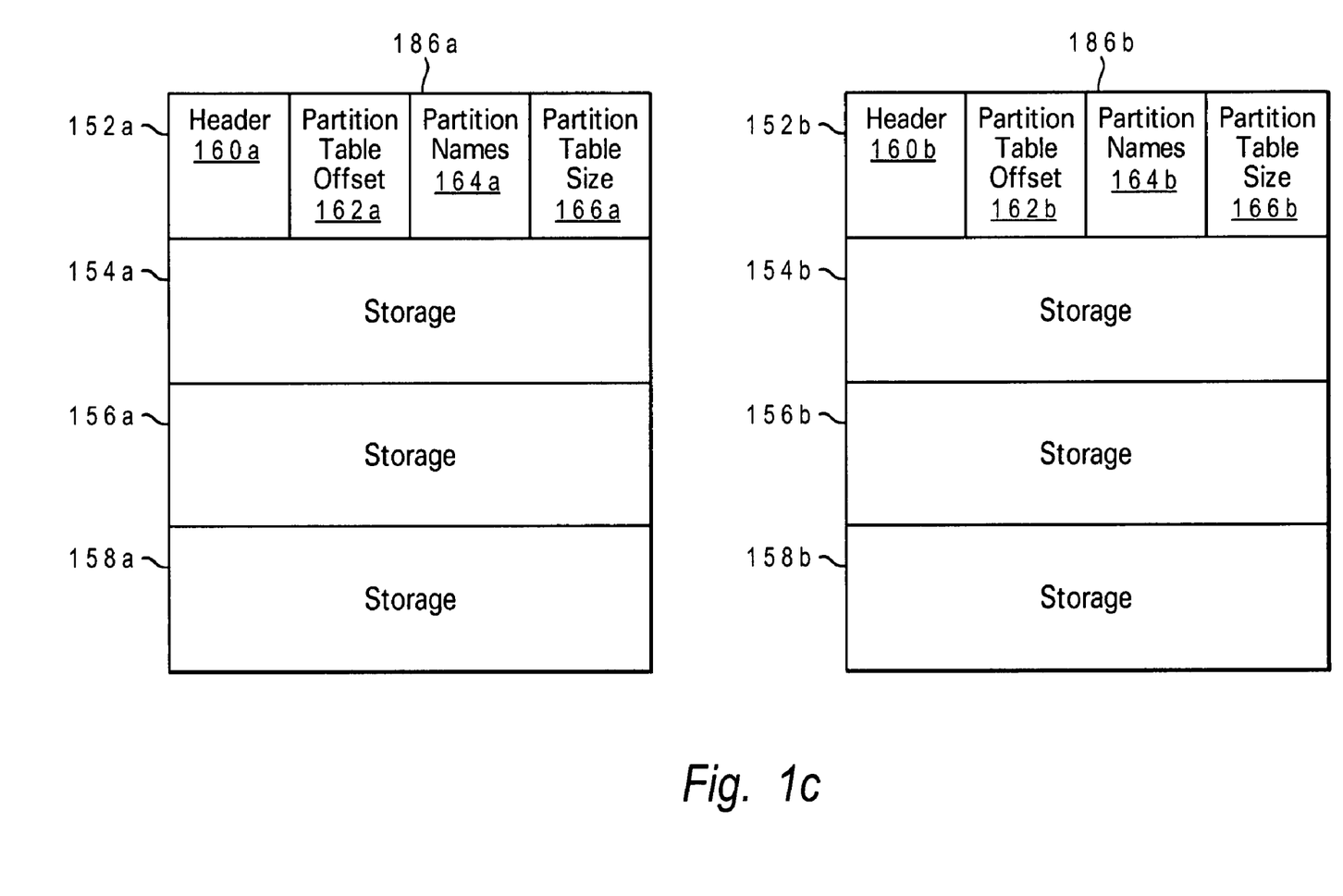
FIG. 1C depicts selected sectors of hard disk drives attached to a data processing system in accordance with a preferred embodiment of the present invention.

Turning now to FIG. 1C, a set of selected sectors of hard disk drives attached to a data processing system in accordance with a preferred embodiment of the present invention are depicted. First hard disk drive 104a contains a group of sectors 186a, containing four sectors 152a-158a. Boot sector 152a contains a header 160a, a partition table offset 162a, partition names 164a and a partition table size 166a, which are collectively referred to as formatting data 160a-166a, while sectors 154a-158a contain stored data, such as that data used by applications. Second hard disk drive 104b contains a groups of sectors 186b, containing four sectors 152b-158b. Boot sector 152b contains a header 160b, a partition table offset 162b, partition names 164b and a partition table size 166b, which are collectively referred to as formatting data 160b-166b, while sectors 154b-158b contain stored data, such as that data used by applications. Thus, sectors 154a-158a of first hard disk drive 104a (and usually do) contain first data different from the second data within sectors 154b-158b of second hard disk drive 104b.

Figure 2:
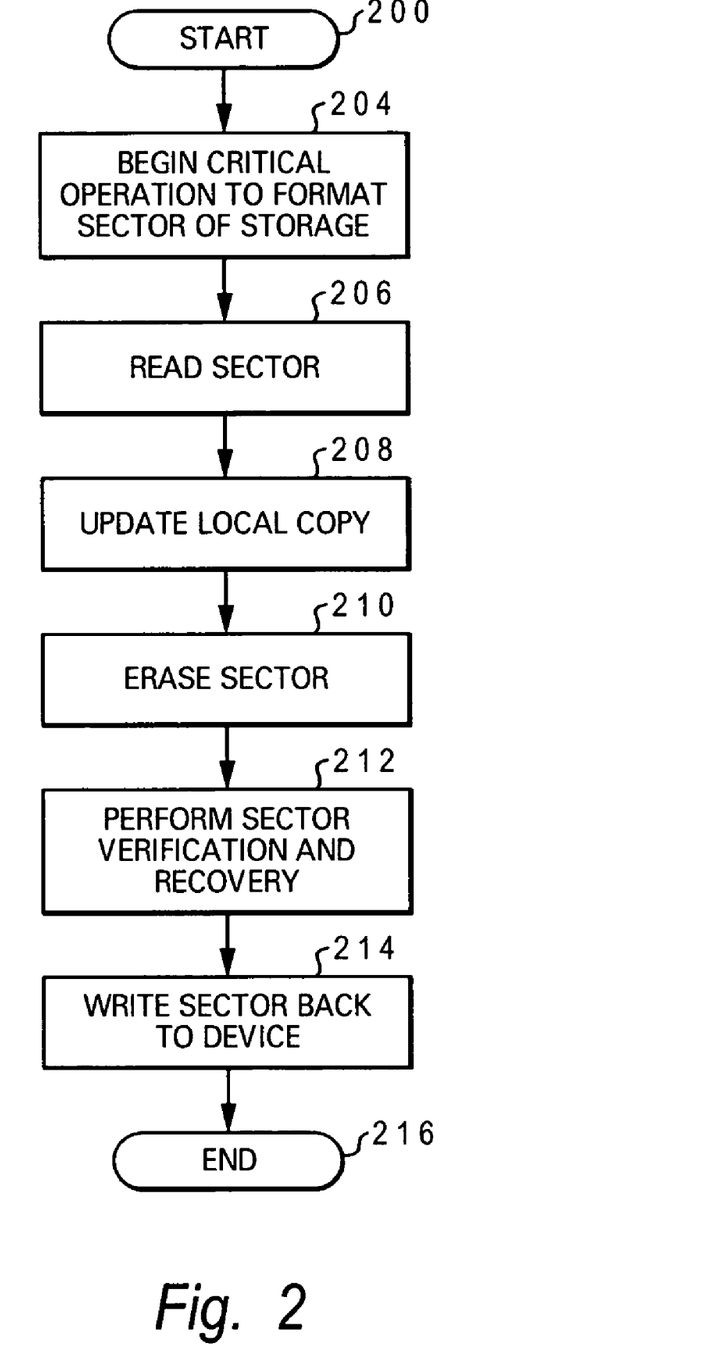
FIG. 2 illustrates a high-level logical flowchart of a method for reading and writing data, which includes performing recovery of formatting in repair of bad sectors in hard disk drive attached to a data processing system in accordance with a preferred embodiment of the present invention.

Turning now to FIG. 2, a high-level logical flowchart of a method for reading and writing data, which includes performing recovery of formatting for repair of bad sectors in storage systems attached to a data processing system in accordance with a preferred embodiment of the present invention is illustrated.

Figure 3:
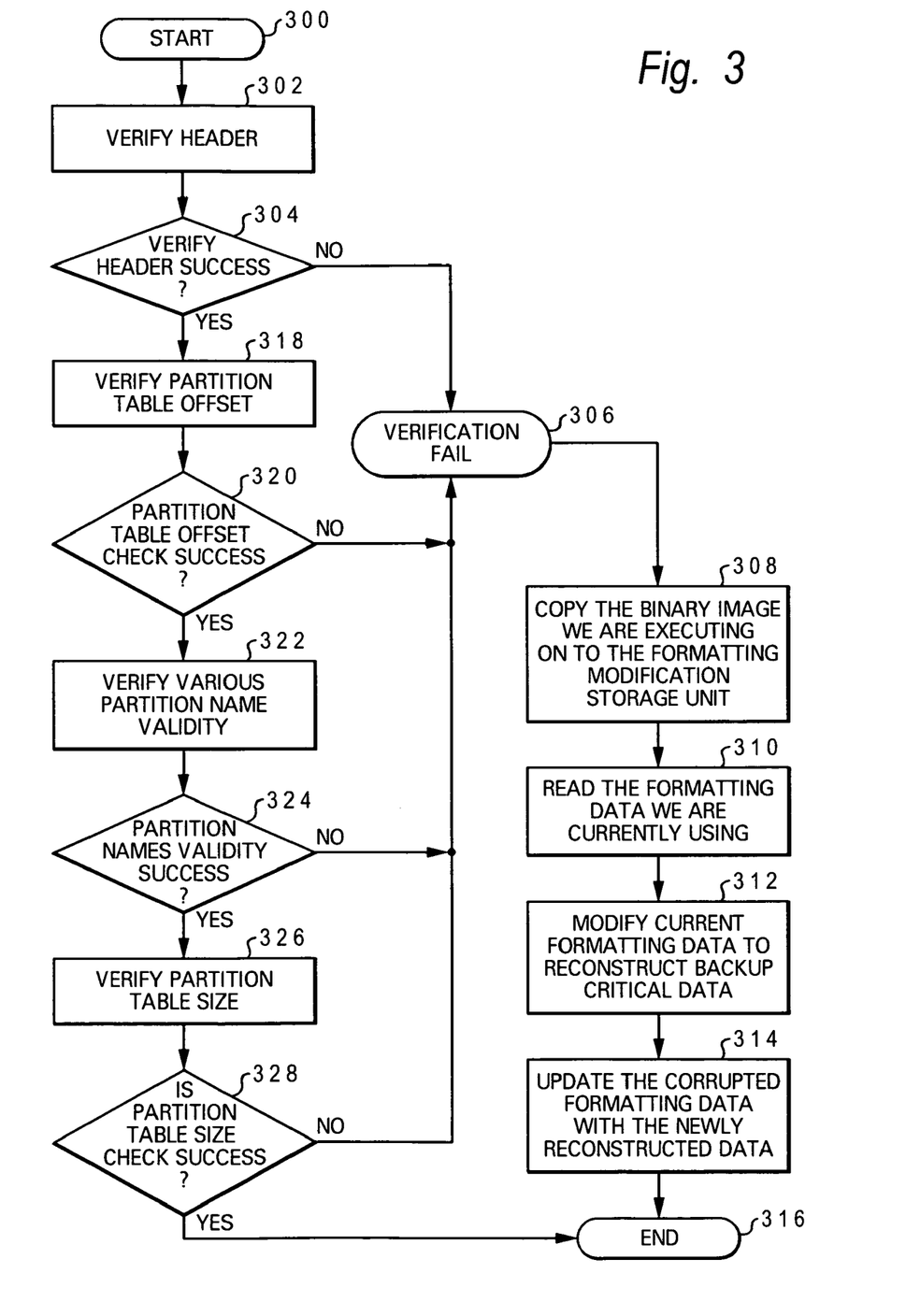
FIG. 3 depicts a high-level logical flowchart of a method for performing recovery of formatting in repair of bad sectors in a hard disk drive attached to a data processing system in accordance with a preferred embodiment of the present invention.

For illustrative purposes, the exemplary discussion of FIG. 2 and FIG. 3 contained herein will refer to a format operation being performed on first hard disk drive 104a, with the use of second hard disk drive 104b to provide backup format data. One skilled in the art will quickly realize that either of first hard disk drive 104a and second hard disk drive 104b may provide backup to the other during format operations. The process starts at step 200, and then proceeds to step 204, which depicts I/O interface 114 beginning a critical operation to a boot sector 152a of storage within hard disk drive 104a. The process next moves to step 206. At step 206, I/O interface 114 reads sector 152a of first hard disk drive 104a. The process then proceeds to step 208, which illustrates I/O interface 114 updating a local copy of the data contained in boot sector 152a of first hard disk drive 104a read in step 206. The process next moves to step 210.

At step 210, I/O interface 114 erases the boot sector 152a of hard disk drive 104a read in step 206. The process then proceeds to step 212, which depicts I/O interface 114 performing verification and recovery functions, which are detailed below with respect to FIG. 3, on the formatting data 160a-166a of boot sector 152a read in step 206. The process next moves to step 214. At step 214, I/O interface 114 rewrites boot sector 152a of first hard disk drive 104a read in step 206. The process then ends at step 216.

Referring now to FIG. 3, a high-level logical flowchart of a method for performing recovery of formatting for repair of bad sectors in hard disk drive systems attached to a data processing system in accordance with a preferred embodiment of the present invention is depicted. The process starts at step 300 and then moves to step 302, which illustrates I/O interface 114 verifying header 160a of boot sector 152a of first hard disk drive 104a read in step 206. The process then proceeds to step 304. At step 304, I/O interface 114 determines whether the verification of header 160a of boot sector 152a of first hard disk drive 104a read in step 206 succeeded. If the verification of header 160a of boot sector 152a of first hard disk drive 104a read in step 206 did not succeed, then the process moves to step 306.

Steps 306-316 represent a generalized recovery process, which is used in response to the determination of a failure of a verification at any of step 304 and steps 318-328 (which are explained below). At step 306, I/O interface 114 asserts an internal flag bit indicating a verification failure. The process next proceeds to step 308, which illustrates I/O interface 114 copying a binary image of a boot sector 152b of second hard disk drive 104b, which is similar to boot sector 152a of first hard disk drive 104a read in step 206, to a formatting modification storage unit 180 in I/O interface 114. The process then moves to step 310, which depicts I/O interface 114 reading formatting data 160b-166b from the binary image in formatting modification storage unit 180 of boot sector 152b of second hard disk drive 104b. The process next proceeds to step 312. At step 312, I/O interface 114 modifies, to the extent necessary, the formatting data 160b-166b from the binary image in formatting modification storage unit 180 of boot sector 152b of second hard disk drive 104b for use as a replacement for the corrupted formatting data 160a-166a of boot sector 152a of first hard disk drive 104a read in step 206.

The necessary modifications will vary with particular embodiments of the present invention and on the basis of differences between the particular type of hard disk drive used and the particular data stored in sectors 154a-158a of hard disk drive 104a and in sectors 154b-158b of hard disk drive 104b. In a preferred embodiment, some data from formatting data 160b-166b is capable of direct reuse. For instance, data extracted from header 160b is directly reusable in header 160a. Likewise, partition table offset 162b is directly reusable as partition table offset 162a and partition table size 166b is directly reusable as partition table size 166a.

In a preferred embodiment, partition names 164a will be derived by changing the trailing digit of partition names 164b to correspond to a designator identifying the hard disk drive 104a in which they exist. A preferred embodiment contains hard disk drive 104b, which is designated by convention as 'hard disk 2' with partition names boot2, kern2, dump2 and user2. A preferred embodiment also contains hard disk drive 104a, which is designated by convention as 'hard disk 1'. When modifying partition names 164b for use as partition names 164a, memory controller 105 will create partition names boot1, kern1, dump1 and user1.

In alternative embodiments, other formatting data 160b-166b, such as partition names 164a will be derived from a scan of the sectors 154a-158a of hard disk drives 104a. Following block 312, the process then moves to step 314, which illustrates I/O interface 114 updating the sector 152a of hard disk drive 104a read in step 206 with the formatting created in step 312 for use as a replacement for the corrupted formatting data 160a-166a formerly present in the sector 152a of hard disk drive 104a read in step 206. The process then ends at step 316.

Returning to the verification process at step 304, if the verification of header 160a of boot sector 152a of first hard disk drive 104a read in step 206 succeeded, then the process moves to step 318, which depicts I/O interface 114 verifying partition offset table 162a of boot sector 152a of first hard disk drive 104a read in step 206. The process next moves 320. At step 320, I/O interface 114 determines whether verification of partition offset table 162a of boot sector 152a of first hard disk drive 104a read in step 206 succeeded. If I/O interface 114 determines that verification of partition offset table 162a of boot sector 152a of first hard disk drive 104a read in step 206 did not succeed, then the process moves to step 306, which is described above. If I/O interface 114 determines that verification of partition offset table 162a of boot sector 152a of first hard disk drive 104a read in step 206 succeeded, then the process proceeds to step 322. At step 322, I/O interface 114 verifies the validity of various partition names 164a in boot sector 152a of first hard disk drive 104a read in step 206.

The process then proceeds to step 324, which depicts I/O interface 114 determining whether verification of the validity of partition names 164a in boot sector 152a of first hard disk drive 104a read in step 206 succeeded. If verification of the validity of partition names 164a in boot sector 152a of first hard disk drive 104a read in step 206 did not succeed, then the process moves to step 306, which is described above. If verification of the validity of partition names 164a in boot sector 152a of first hard disk drive 104a read in step 206 succeeded, then the process moves to step 326, which illustrates I/O interface 114 verifying partition table size 166a of boot sector 152a of first hard disk drive 104a read in step 206. The process then moves to step 328. At step 328, I/O interface 114 determines whether verification of partition table size 166a of boot sector 152a of first hard disk drive 104a read in step 206 succeeded. If verification of partition table size 166a of boot sector 152a of first hard disk drive 104a read in step 206 did not succeed, then the process moves to step 306, which is described above. If verification of partition table size 166a of boot sector 152a of first hard disk drive 104a read in step 206 succeeded, then the process ends at step 316.

As shown with respect to first hard disk drive 104a and second hard disk drive 104b, the present invention takes advantage of a dual media image design, in which similar copies of formatting data, also called critical data, exist in different boot sectors 152a and 152b in a hard disk drive or within multiple units of flash memory. If and when an interruption to an operation touching formatting data 160a-166a causes corruption of a boot sector 152a of formatting data 160a-166a, the present invention detects the corruption and utilizes a similarly formatted boot sector 152b as a template to reconstruct the corrupted formatting data 160a-166a. The reconstructed formatting is then used to repair the corrupted boot sector 152a, allowing the system to return to full capability and function without alerting the user to the corruption.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for correcting a formatting data error in a boot sector of a hard disk drive of a data processing system, said method comprising:
    discovering a formatting error in a first formatting data in a boot sector of a first hard disk drive of a data processing system, wherein said first formatting data includes a first partition table information of said first hard disk drive;
    extracting from a second hard disk drive of said data processing system storing second data a second formatting data and transferring said second formatting data to a formatting modification storage unit, wherein said second formatting data includes a second partition table information of said second hard disk drive, wherein said first partition table information is nonidentical to said second partition table information before a formatting data error is present in said boot sector of said first hard disk drive;
    replacing in said boot sector of said first hard disk drive said erroneous first formatting data with formatting data modified within said formatting modification storage unit using template information derived from said second formatting data; and
    storing first data in said first hard disk drive with said formatting data modified within said formatting modification unit using said template information derived from said second formatting data, wherein said first data is different from said second data, wherein said formatting data error is an error in a sector of said first hard disk drive that stores partition table information.

2. The method of claim 1, further comprising the step of generating a copy of said second formatting data in a boot sector of said second hard disk drive.

3. The method of claim 2, wherein the step of generating a copy of said second formatting data in said boot sector of said second hard disk drive further comprises the step of copying a binary image of said second formatting data in said boot sector of said second hard disk drive onto said formatting modification storage unit.

4. The method of claim 3, wherein said step of copying a binary image of said second formatting data in said boot sector of said second hard disk drive onto said formatting modification storage unit further comprises the step of copying a binary image of said second formatting data in said boot sector of said second hard disk drive onto a formatting modification storage unit in an I/O interface.

5. The method of claim 1, wherein said step of discovering a formatting error in a first formatting data in a boot sector of a first hard disk drive further comprises:
    verifying a first header in said first hard disk drive;
    verifying a first partition table offset in said first hard disk drive;
    verifying a first validity of a partition name in said first hard disk drive; and
    verifying a first partition table size in said first hard disk drive.

6. The method of claim 1, wherein said step of replacing in said boot sector of said first hard disk drive said erroneous first formatting data with formatting data modified within said formatting modification storage unit using template information derived from said second formatting data further comprises the step of modifying said second formatting data of said boot sector of said second hard disk drive to construct a modification of said first formatting data of said first hard disk drive.

7. The method of claim 1, wherein said step of extracting from said second hard disk drive of said data processing system storing second data said second formatting data further comprises extracting a second header, a second partition table offset, a second partition name, and a second partition table size from said second hard disk drive.

8. A system for correcting a formatting data error in a boot sector of a hard disk drive of a data processing system, said system comprising:
    at least one processing unit;
    at least one memory coupled to said at least one processing unit;
    an I/O interface coupled to said at least one memory, wherein said I/O interface includes a formatting modification storage unit; and
    wherein said at least one memory stores executable code for:
    discovering a formatting error in a first formatting data in a boot sector of a first hard disk drive of a data processing system, wherein said first formatting data includes a first partition table information of said first hard disk drive;
    extracting from a second hard disk drive of said data processing system storing second data a second formatting data and transferring said second formatting data to a formatting modification storage unit, wherein said second formatting data includes a second partition table information of said second hard disk drive, wherein said first partition table information is nonidentical to said second partition table information before a formatting data error is present in said boot sector of said first hard disk drive;
    replacing in said boot sector of said first hard disk drive said erroneous first formatting data with formatting data modified within said formatting modification storage unit using template information derived from said second formatting data; and
    storing first data in said first hard disk drive with said formatting data modified within said formatting modification unit using said template information derived from said second formatting data, wherein said first data is different from said second data, wherein said formatting data error is an error in a sector of said first hard disk drive that stores partition table information.

9. The system of claim 8, wherein said at least one memory stores executable code for generating a copy of said second formatting data in a boot sector of said second hard disk drive.

10. The system of claim 9, wherein said executable code for generating a copy of said second formatting data in said boot sector of said second hard disk drive further comprises executable code for copying a binary image of said second formatting data in said boot sector of said second hard disk drive onto said formatting modification storage unit.

11. The system of claim 10, wherein said executable code for copying a binary image of said second formatting data in said boot sector of said second hard disk drive onto said formatting modification storage unit further comprises executable code for copying a binary image of said second formatting data in said boot sector of said second hard disk drive onto a formatting modification storage unit in an I/O interface.

12. The system of claim 8, wherein said executable code for discovering a formatting error in a first formatting data in a boot sector of a first hard disk drive further comprises:
   executable code for verifying a first header in said first hard disk drive;
   executable code for verifying a first partition table offset in said first hard disk drive;
   executable code for verifying a first validity of a partition name in said first hard disk drive; and
   executable code for verifying a first partition table size in said first hard disk drive.

13. The system of claim 8, wherein said executable code for replacing in said boot sector of said first hard disk drive said erroneous first formatting data with formatting data modified within said formatting modification storage unit using template information derived from said second formatting data further comprises executable code for modifying said second formatting data of said boot sector of said second hard disk drive to construct a modification of said first formatting data of said first hard disk drive.

14. The system of claim 8, wherein said executable code for extracting from said second hard disk drive of said data processing system storing second data said second formatting data further comprises executable code for extracting a second header, a second partition table offset, a second partition name, and a second partition table size from said second hard disk drive.

15. A tangible machine-readable storage medium having a plurality of instructions processable by at least one processing unit contained within a machine embodied therein, wherein said plurality of instructions, when processed by said at least one processing unit, causes said machine to perform a method for correcting a formatting data error in a boot sector of a hard disk drive of a data processing system, comprising:
   discovering a formatting error in a first formatting data in a boot sector of a first hard disk drive of a data processing system, wherein said first formatting data includes a first partition table information of said first hard disk drive;
   extracting from a second hard disk drive of said data processing system storing second data a second formatting data and transferring said second formatting data to a formatting modification storage unit, wherein said second formatting data includes a second partition table information of said second hard disk drive, wherein said first partition table information is nonidentical to said second partition table information before a formatting data error is present in said boot sector of said first hard disk drive;
   replacing in said boot sector of said first hard disk drive said erroneous first formatting data with formatting data modified within said formatting modification storage unit using template information derived from said second formatting data; and
   storing first data in said first hard disk drive with said formatting data modified within said formatting modification unit using said template information derived from said second formatting data, wherein said first data is different from said second data, wherein said formatting data error is an error in a sector of said first hard disk drive that stores partition table information.

16. The tangible machine-readable storage medium of claim 15, said method further comprising the step of generating a copy of said second formatting data in a boot sector of said second hard disk drive.

17. The tangible machine-readable storage medium of claim 16, wherein the step of generating a copy of said second formatting data in said boot sector of second hard disk drive further comprises the step of copying a binary image of said second formatting data in said boot sector of said second hard disk drive onto said formatting modification storage unit.

18. The tangible machine-readable storage medium of claim 17, wherein said step of copying a binary image of said second formatting data in said boot sector of said second hard disk drive onto said formatting modification storage unit further comprises the step of copying a binary image of said second formatting data in said boot sector of said second hard disk drive onto a formatting modification storage unit in an I/O interface.

19. The tangible machine-readable storage medium of claim 15, wherein said step of discovering a formatting error in a first formatting data in a boot sector of a first hard disk drive further comprises:
   verifying a first header in said first hard disk drive;
   verifying a first partition table offset in said first hard disk drive;
   verifying a first validity of a partition name in said first hard disk drive; and
   verifying a first partition table size in said first hard disk drive.

20. The tangible machine-readable storage medium of claim 15, wherein said step of replacing in said boot sector of said first hard disk drive said erroneous first formatting data with formatting data modified within said formatting modification storage unit using template information derived from said second formatting data further comprises the step of modifying said second formatting data of said boot sector of said second hard disk drive to construct a modification of said first formatting data of said first hard disk drive.

* * * * *